United States Patent
Ganani et al.

(10) Patent No.: US 7,289,609 B2
(45) Date of Patent: Oct. 30, 2007

(54) METHOD AND DEVICE FOR BROADCASTING MESSAGES

(75) Inventors: Nir Ganani, Azor (IL); Assaf Bahat, Berlin (DE)

(73) Assignee: Tadiran Telecom Business Systems Ltd., Petach Tikva (IL)

( * ) Notice: Subject to any disclaimer, the term of this patent is extended or adjusted under 35 U.S.C. 154(b) by 305 days.

(21) Appl. No.: 10/746,503

(22) Filed: Dec. 29, 2003

(65) Prior Publication Data

US 2005/0025292 A1    Feb. 3, 2005

(30) Foreign Application Priority Data

Aug. 3, 2003 (IL) .................................... 157205

(51) Int. Cl.
    *H04M 1/64* (2006.01)
(52) U.S. Cl. ................ 379/88.25; 379/88.16; 370/248
(58) Field of Classification Search .......... 379/88.19, 379/88.21, 88.22, 88.16, 88.25; 370/248
    See application file for complete search history.

(56) References Cited

U.S. PATENT DOCUMENTS

| | | | |
|---|---|---|---|
| 4,788,715 A | 11/1988 | Lee | |
| 4,788,718 A | 11/1988 | McNabbe et al. | |
| 5,025,468 A | 6/1991 | Sikand et al. | |
| 5,440,623 A | 8/1995 | Moore et al. | |
| 5,515,421 A * | 5/1996 | Sikand et al. | 379/88.21 |
| 6,314,178 B1 | 11/2001 | Walker et al. | |
| 6,442,247 B1 | 8/2002 | Garcia | |
| 2002/0001371 A1 * | 1/2002 | Goldberg et al. | 379/88.22 |
| 2002/0129095 A1 | 9/2002 | Hatalkar | |
| 2003/0223375 A1 * | 12/2003 | Govreen-Segal | 370/248 |

FOREIGN PATENT DOCUMENTS

WO    WO-03/005736    1/2003

* cited by examiner

*Primary Examiner*—Gerald Gauthier
(74) *Attorney, Agent, or Firm*—Browdy And Neimark, PLLC

(57) ABSTRACT

A method is provide for using a communication device which comprises a plurality of ports adapted to receive a plurality of communication sessions. The method comprises the steps of identifying subscribers having at least a first common characteristic, retrieving real time updated information applicable to the identified subscribers and broadcasting to these subscribers a message based on the real time updated information retrieved via designated ports connected to the communication device, wherein the number of designated ports is less than the number of ports utilized by these subscribers.

17 Claims, 4 Drawing Sheets

METHOD AND DEVICE FOR BROADCASTING MESSAGES

FIELD OF THE INVENTION

The present invention relates to a computerized telephone system and particularly to a system adapted for routing a single message broadcasted to a group of callers.

BACKGROUND OF THE INVENTION

Interactive Voice Response ("IVR") systems have the ability to identify callers and play unique messages that are 'tailored' just for these specific callers. The major problem associated with these systems is the cost involved, as each IVR port is one of the most expensive resources in a contact center environment.

Another type of systems related to contact center environment, are traditional Automatic Call Distribution ("ACD") systems which have the ability to play voice messages to any number of callers at a given time, using single voice resource. Typically, ACD software can ensure that each customer listen to the voice message once, or in the alternative, can play a repeating voice message in an endless loop. The problem associated with this method, is, that the voice message played by the ACD is a fixed and pre-determined message, that must be pre-recorded and cannot be changed.

Various automatic telephone systems and ACD systems are well known in the art per se and will not be described here in detail. Such systems are found for example in U.S. Pat. No. 4,788,718; U.S. Pat. No. 5,025,468 and other publications. Typically, in operation, the callers are placed on hold in a queue and then, are connected to the next available agent according to a priority decisions, for interaction communication.

According to traditional contact center systems, after understanding who is the caller and what are his/her needs, the call can be left on an IVR port while waiting to a live agent or be placed on PBX queue (ACD) until such time that appropriate agent will become available. However, such an ACD scheme does not have the capability of collecting a number of callers to allow broadcasting of a message to the collected callers. Also, separate connections are required to be made in the ACD scheme to each, one for each separate agent. In other words, provisions are not made for providing a single message source, nor for connecting that message source to one or more groups of assembled callers.

Some attempts were made to solve this drawback. In U.S. Pat. No. 5,515,421 a method is described for assembling callers by a common pre-determined attribute, such as a caller I.D., to a group, and holding that group of callers in a queue for the broadcast of a pre-recorded message.

U.S. Pat. No. 6,314,178 describes a method and apparatus for enabling interaction between callers with calls positioned in a queue. The call handling system allows queuing a call when no agent is available to service the call and provides the caller with options to keep him/her busy, e.g. to monitor (but not participate in) other caller conversations with similar queries, to listen to recorded calls involving similar queries; or to connect to a communication channel so as to allow the monitoring of a call while not losing place in the queue for a next available agent. Also, the caller is given a further option to enter a "chat room" where callers having like problems can converse until an agent becomes available.

The disclosures of all references mentioned above and throughout the present specification are hereby incorporated herein by reference.

However, none of these solutions provide adequate solution to better utilization of the system resources, in certain cases where a message is broadcasted to a number of callers.

SUMMARY OF THE INVENTION

One object of the present invention is to provide a method and a device that are adapted to enable broadcasting messages to a group of subscribers, where these messages comprise real time information or are based upon most updated information available. Further objects and features of the invention will become apparent from the following description and the accompanying drawings.

In a preferred embodiment of the invention, there is provided a method of using a communication device comprising a plurality of ports adapted to receive plurality of communication sessions, which method comprises the steps of identifying subscribers having at least a first common characteristic, retrieving real time updated information applicable to the identified subscribers and broadcasting to the identified subscribers a message based on the real time updated information via designated ports connected to the communication device, wherein the number of designated ports is less than the number of the subscribers having the at least one common characteristic. Preferably, the number of the designated ports is equal to one.

The term "subscriber" as used herein should be understood to denote a caller using the telephone network to establish a communication session, e.g. a voice call, and to denote a computer user, using a packetized network, for example the Internet, to establish a communication session, e.g. through the use of voice over the Internet Protocol.

According to another preferred embodiment of the invention, the method provided comprises the steps of:

receiving a first plurality of communication sessions;

identifying subscribers having a first common characteristic;

identifying a second plurality of communication sessions out of said first plurality of communication sessions, wherein subscribers associated with said second plurality of communication sessions are those identified as having a first common characteristic;

retrieving real time updated information applicable to the subscribers associated with the second plurality of communication sessions;

arranging the second plurality of communication sessions in a first group of communication sessions;

connecting the first group of communication sessions to a first designated port connected to a real time message generator; and broadcasting to the subscribers associated with the first group of communication sessions, a first message constructed in response to the first common characteristic.

According to another preferred embodiment of the invention, at least part of the real time updated information is retrieved from the Internet.

By yet another preferred embodiment of the invention, the subscribers are telephone callers and communication sessions are telephone calls.

In accordance with yet another preferred embodiment of the present invention, in addition or in the alternative, at least part of the real time updated information is retrieved from a dynamically updateable database.

By yet another preferred embodiment, in addition or in the alternative, at least part of the real time updated information is retrieved from signaling details associated with the communication session. Preferably, the at least part of the real time updated information is retrieved from a member of the group comprising: Automatic Number Identification ("ANI"), Dialed Number Identification Service ("DNIS"), voice recognition of the subscriber, any combination thereof, and the like.

According to still another embodiment, in addition or in the alternative, at least part of the real time updated information is retrieved from information provided by the subscribers associated with the second plurality of communication sessions, e.g. by using an IVR system.

In accordance with a preferred embodiment of the invention, the message generator comprises a text to speech converter, e.g. when information is retrieved from the Internet in the form of a text, it is operative to convert the text into speech, and the information can be played to the group of subscribers in a voice format.

By still another embodiment of the invention, the at least first common characteristic comprises a common interest in receiving certain information and/or receiving certain service, which is of interest to the group of subscribers to whom the message will be broadcasted, e.g. a group of people interested to know the results of a sport competition.

According to yet another embodiment of the invention, the step of connecting the first group of communication sessions includes the steps of:

measuring a period time lapsed since a first of the second plurality of communication sessions has been associated with the first group; and responsive to the step of measuring the period of time, connecting the first group to the message generator.

In accordance with another embodiment the message generator is adapted to broadcast a first message in response to the completion of previous broadcasting of that first message. Such repeatedly broadcast continues until at least part of the information contained in that message is replaced with new information, thereby forming a second message, which will be played to that group of subscribers instead of the first message. Therefore, a subscriber can join such a group after the beginning of the first message has already been played for the already existing other subscribers in that group, but as the message will be replayed from the beginning for this and/or other subscribers that just joined the group, once its current broadcast is completed. Still, as explained above, in order to play updated messages to the subscribers, once there is new, updated information that can replace that comprised in the first message, a new, second message is constructed. Preferably, after such new message has been prepared, it will be played to that group at the first opportunity. More preferably, it will be played to that group after a broadcast of the previous message is completed.

By yet another embodiment, the grouping of the subscribers to a group to which a message is broadcasted is done while the subscribers are waiting to be serviced by a call agent.

According to still another embodiment, the method provided further comprises the steps of:

identifying a third plurality of communication sessions among the second plurality of communication sessions, where the subscribers associated with the third plurality of communication sessions having a second common identifying characteristic;

arranging a second group of communication sessions comprising that second plurality of communication sessions;

connecting the second group of communication sessions to the message generator, to receive a second message; and broadcasting the second message to the subscribers associated with the second group of calls.

Preferably, the step of identifying the subscribers associated with the third plurality of communication sessions is made in response to further information received from the relevant subscribers. Thus, hierarchical levels all which are serviced by broadcasted messages may be constructed, which in turn contributes to a substantial saving in the system resources.

In accordance with another embodiment, the method of further comprises the steps of:

identifying at least one other port associated with the communication device adapted for broadcasting messages; and connecting the second group of communication sessions through the at least one other port, to receive a second message from the message generator, through the at least one other port.

According to another aspect of the invention, there is provided a communication device adapted to aggregate a set of communication sessions (e.g. of telephone calls) associated with subscribers identified by at least one common characteristic, and to allow broadcasting of a real time updated message thereto via at least one designated port associated with the communication device, wherein the communication device comprises:

means for receiving a first plurality of communication sessions initiated by a first plurality of subscribers;

means for identifying a second plurality of communication sessions among the first plurality of communication sessions associated with subscribers having a first common characteristic;

means for arranging the second plurality of communication sessions associated with subscribers having the first common characteristic, in a first group of communication sessions;

message generator adapted to retrieve real time updated information applicable to the subscribers associated with the second plurality of communication sessions, and to broadcast to them a message comprising real time updated information.

Preferably, the means for identifying a second plurality of communication sessions further comprises means for interacting with the subscribers associated with the second plurality of communication sessions.

By another embodiment of the invention, the communication device further comprises a storage device operative to store a plurality of messages, means to update stored messages, and means to select the appropriate message from among said plurality of messages to be played to the group of subscribers.

DESCRIPTION OF THE DRAWINGS

A better understanding of the present invention is obtained when the following non-limiting detailed description is considered in conjunction with the following drawings in which.

DETAILED DESCRIPTION OF THE INVENTION

The present invention will be understood and appreciated more fully from the following detailed description, taken in conjunction with the drawings, of certain non-limiting examples demonstrating the invention.

By one embodiment of the present invention, there is provided a system where telephone callers may typically be classified through a) the use of the telephone service provider's (the Telco) data, such as ANI, DNIS and the like; and/or b) through information entered by each individual caller in an IVR session; and/or c) through information retrieved from a database in response to either the use of the telephone service provider's data and/or information entered by the individual caller in the IVR session. A group of callers having a common interest or common need, may then preferably be directed to PABX ACD in order to save the need in expensive IVR ports, e.g. while waiting for a live agent to become available. At this point, the system of the present invention offers the use of a single IVR port via which a dynamic, 'tailored' voice message can be played to the entire group of callers. For example, the callers may listen to a message about the weather in their local area, get results of the last PTA meeting (in case all the callers are identified as parents to children of the same age group and residing at the same neighborhood, etc. The message may be a completely dynamic message, or alternatively, comprise a combination of a fixed part and a dynamic part, using one or more contact center technologies that are known in the art per se such as Text To Speech ("TTS") conversion to compose messages that are based upon data (e.g. text) derived from a weather web site, a given dynamic database, or other sources. Alternatively, the message may be one that is broadcasted by a live operator to that group of callers.

Figure 1:
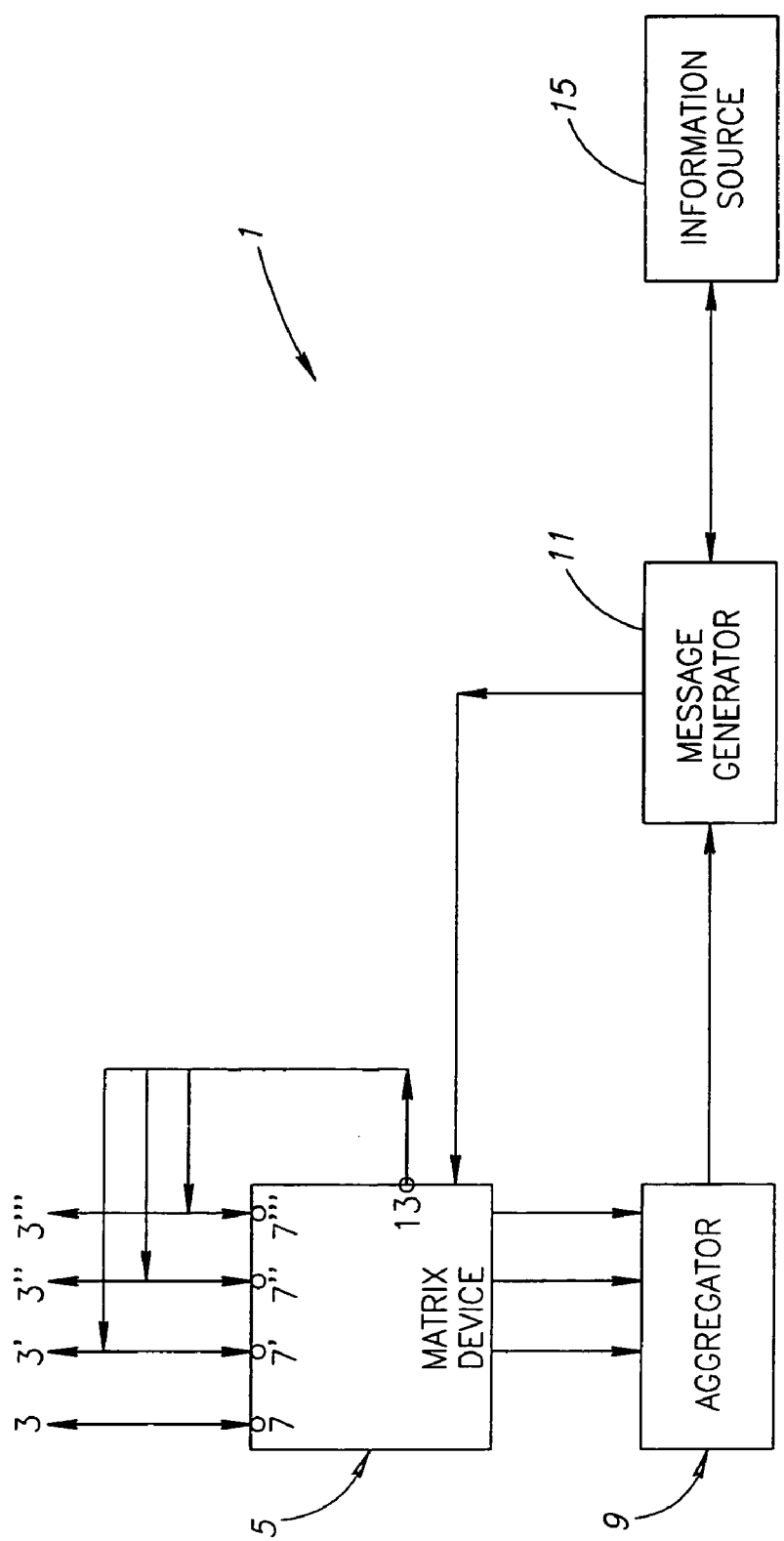
FIG. 1 presents a schematic block diagram of main functionalities included in a system constructed according to a preferred embodiment of the present invention.

Turning now to FIG. 1, which is a simplified block diagram illustration of a preferred implementation of system 1 which is constructed and operative in accordance with a preferred embodiment of the present invention.

As demonstrated in this Figure, number of callers, 3, 3', 3" and 3''' establish connections with matrix device 5. Each of the calls arrives at that matrix device via a dedicated port, 7, 7', 7" and 7''', respectively. The calls are processed, e.g. certain related details associated with each of the calls are extracted from the signaling system, and/or via an IVR system that allows interacting with the callers and receiving certain details from them. The information retrieved is processed by a processor (not shown in the Figure) associated with matrix device 5, and the calls originated by those callers (3', 3" and 3''') that are suited to be grouped in a group to receive a broadcast of a message, are aggregated and grouped in aggregator 9 and forward to a message generator 11, where appropriate data is gathered for composing the dynamic message. The message is generated and prepared for playing to this group of callers, via port 13 of matrix device 5. Thus, in this particular example, only one port, 13, is needed instead of dedicating 3 ports to play the message to the three callers belonging to the group (3', 3" and 3'''), meanwhile the ports through which the communication sessions reached originally the matrix device (7', 7" and 7''') may be freed and used to establish communication with other subscribers. Optionally, the system described in this embodiment can be further extended and used for the establishing of a conference call, whereby people that are intended to participate in such a conference call are gathered as described above to create a group of callers, preferably a message is broadcasted to all of these callers, informing them that they are about to start the conference call, or that they are still waiting to other participants who have not yet joined the group of callers, etc. and thereafter, all the group callers are channeled into the conference session.

As previously explained, the dynamic data may be retrieved from data received from the telephone company, e.g. the ANI of the callers, etc. and used in defining the group of callers. Also, based on that information, a dynamic message may be composed and played to that group of callers in a way as explained above. In addition, or in the alternative, certain applicable data may be dynamically retrieved from an information source 15, e.g. the Internet, and be used while composing that message. The data can either be received at message generator 11, for example in response to a certain pre-defined profiling request for updating the information available at the message generator, and/or in response to a request for information initiated at the message generator, e.g. in response to the characteristics of the group to which the message is about to be played.

Figure 2:
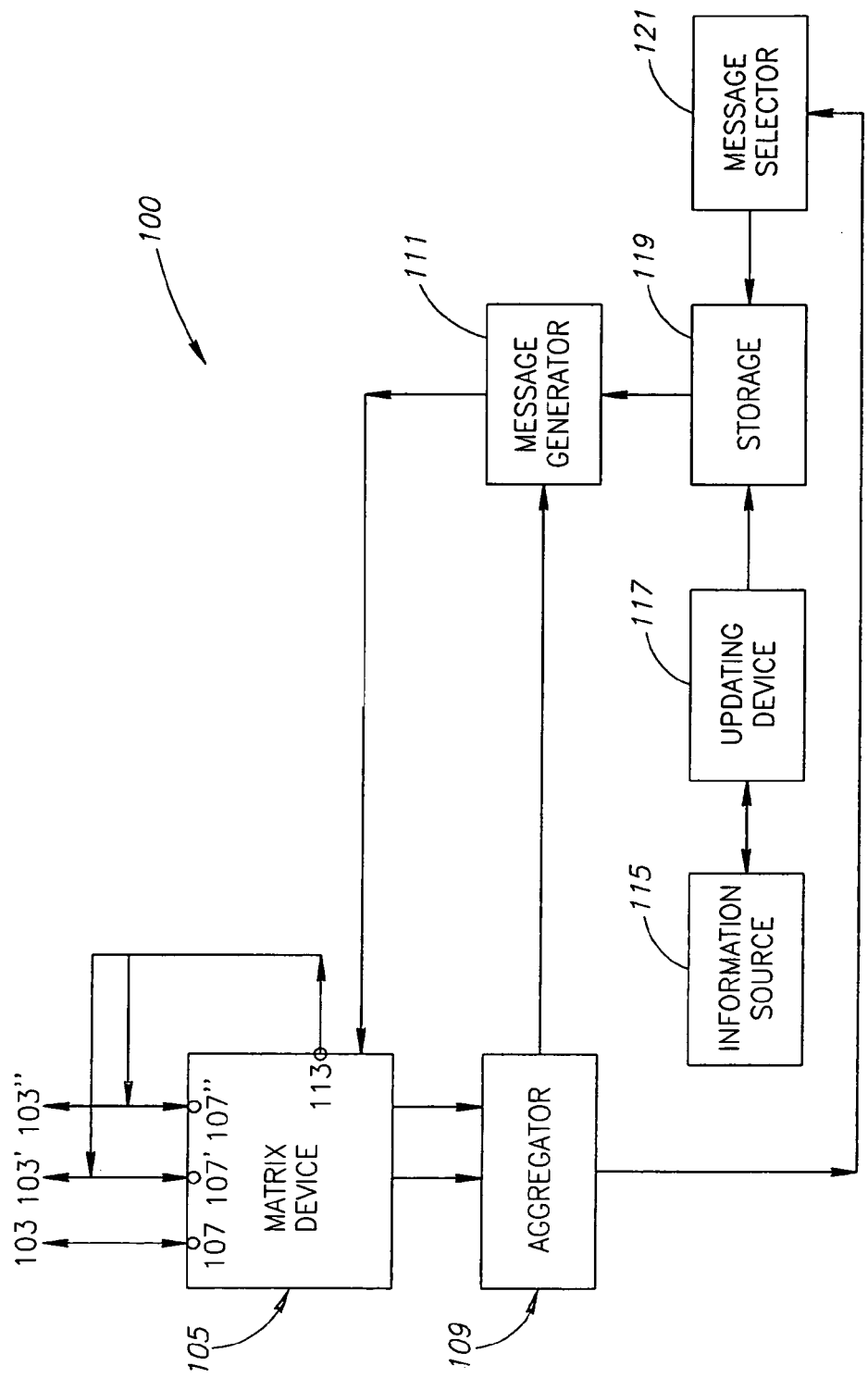
FIG. 2 presents a schematic block diagram of another system according to a preferred embodiment of the present invention.

FIG. 2 demonstrates a simplified block diagram illustration of another preferred implementation of a system (100) constructed and operative in accordance with another preferred embodiment of the present invention.

A number of callers, 103, 103' and 103" establish connections with matrix device 105. Each of the calls arrives at that matrix device via a dedicated port, 107, 107' and 107", respectively. The calls are processed at the matrix device as explained in the description of FIG. 1, above, or may be directly forwarded along with (or without) the other calls associated with callers (103' and 103"), that were determined to be suited for the group that is about to receive a broadcast of a message. The calls are aggregated and grouped in aggregator 109 and forward to a message generator 111, where appropriate data is gathered for composing the dynamic message and a message to be played to this group of callers via port 113 of matrix device 105, is generated. In this example, several sources may be used to derive the data required for composing the dynamic message. One of them is an information source (not shown here) that is directly connected to message generator 111 as explained in the example illustrated in FIG. 1. However, in this example a storage device, e.g. database, 117 is linked to message generator 111. The storage device is updated by updating device 117, which could be an application with pre-defined profiles of operation and is operative to access one or more information sources 115, retrieved updated information therefrom, and update the database of storage device 119, accordingly. This way the database is maintained with updated (dynamic) data. Upon determining which of the calls are aggregated in the group, certain characteristics of the group are forwarded to a message selector 121. The message selector then access storage device 119 so as to select the data that will be suited for that group of callers. The data is forwarded from the storage device to the message generator, where a message is generated to be played to this group of callers via port 113 of contact center 115.

Additionally, several groups may receive broadcast at the same time e.g. by sending multiplexed transmissions comprising a plurality of messages all of which, or part of which, are to be broadcasted, and de-multiplexing them before the messages are delivered to the destination callers.

Figure 3:
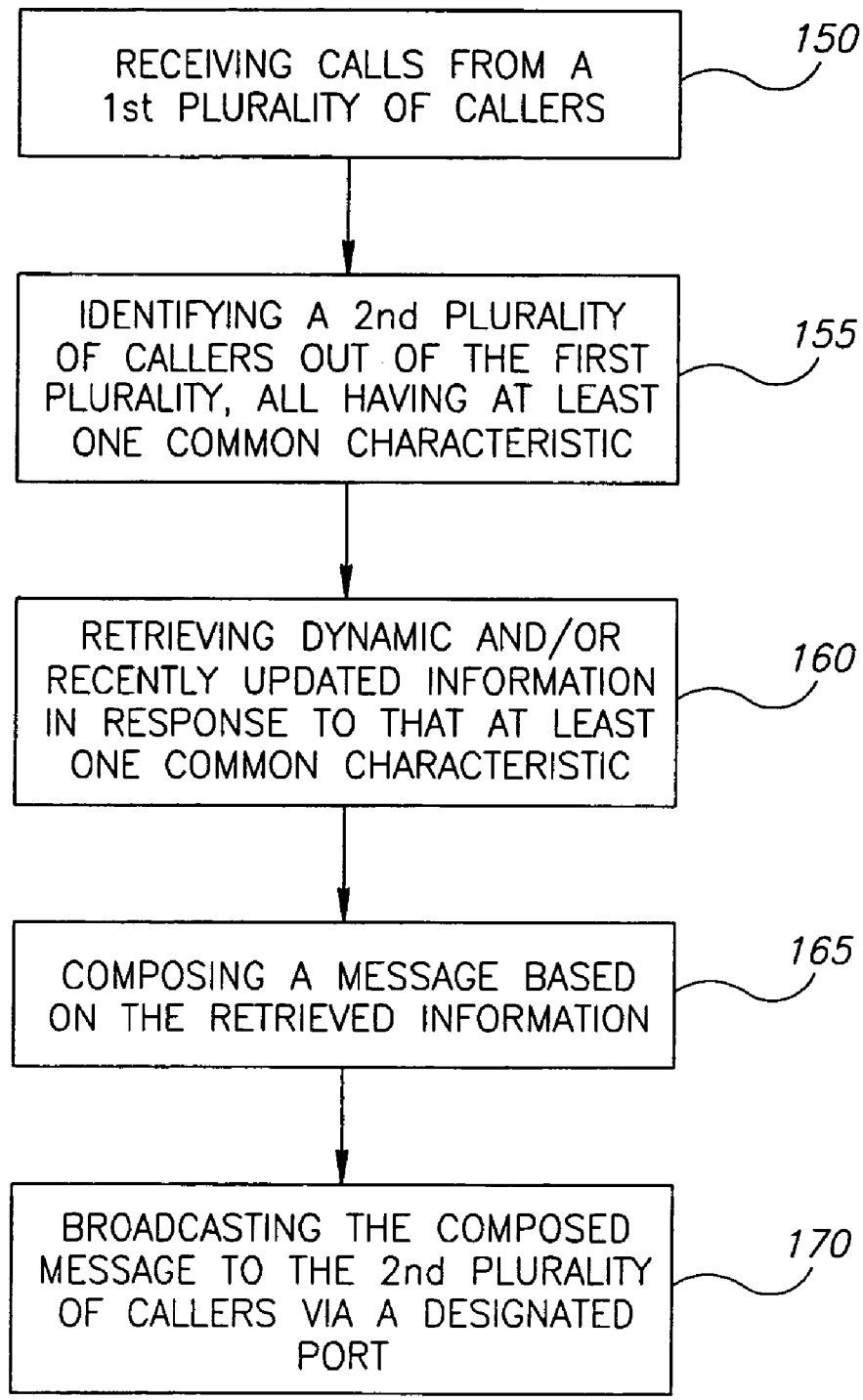
FIG. 3 illustrates a flow chart describing operation of a preferred embodiment according to the present invention.

FIG. 3 presents a flow chart demonstrating a method of carrying out the present invention. Step 150 comprises receiving a plurality of telecommunication sessions e.g. voice over IP calls via a plurality of ports. The callers associated with these calls are identified (step 155) so as to establish whether there is a group of callers out of the plurality of callers that have at least a first common characteristic. Once such a group is identified, and the common characteristics associated with that group are known, real time updated information applicable to these identified callers belonging to the group is retrieved (step 160). Based on the information retrieved, a message is composed (step 165), where this message may be a message composed at a pre-defined format, incorporating fixed part(s) and information (or at least part of the information) retrieved at step 160. Following the construction of the message, it is broadcasted to each of the identified callers belonging to that group (step 170) via a designated port (or number of designated ports), converted into IP packets and transmitted to the callers. Following the transmission of the packets to the callers, the group may still remain as one group and preferably may receive the same or other message(s) that relate to the group and is based on the common identified characteristic. Alternatively, the group may be disassembled and each of the communication sessions may either be disconnected or maintained to wait for resuming operation, e.g. to connect the caller to a call agent.

Figure 4:
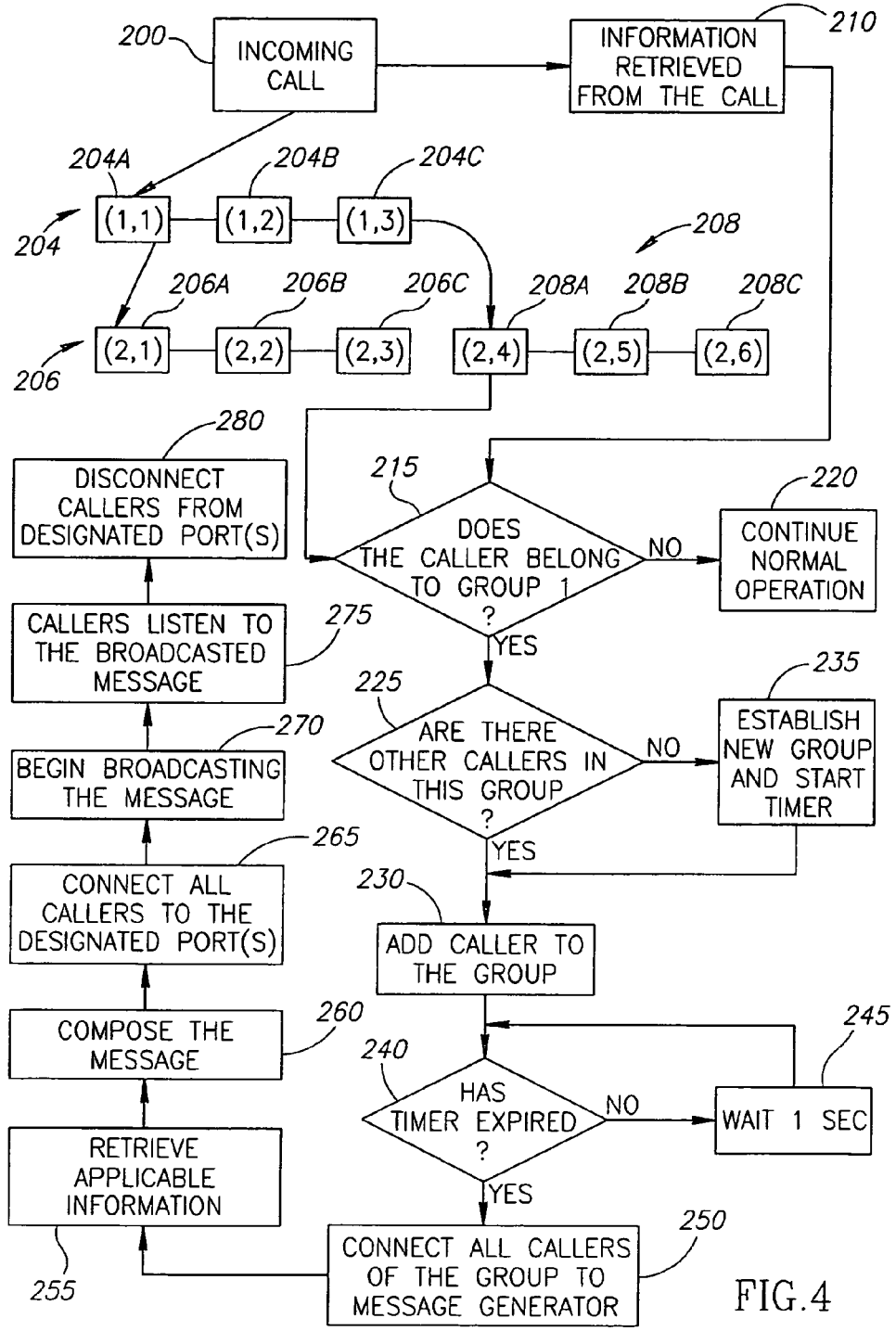
FIG. 4 presents a flow chart describing operation of another preferred embodiment according to the present invention.

The flow chart shown in the FIG. 4 describes another embodiment of a process for correctly identifying the incoming call as belonging to a group to which a single message will be broadcasted, with the option of holding that call until the correct time, according to preset priority, when a message is broadcasted to that caller and all of the callers belonging to that group.

Various techniques may be used in gathering non-interactive information which may assist while assembling the callers' group. For example, the trunk port or source port for the call may be identified in a look-up table classified by an attribute such as the caller broadcast ID group.

Additionally, when such a group is initiated, a timer is started to measure a period of time that has lapsed since the first caller has been put in that group. It would be clear to those skilled in the art, that other priority schemes could also (or instead) be used, such as a number of callers in the group or the times since the last broadcast was made for that group of identified callers. Such priority scheme is not essential to the present invention and for that reason will not be discussed in detail.

Continuing, according to the principles of the invention as manifested in this embodiment, when the timer for the group has expired, all of the callers that presently belong to a certain group are connected to a receive a single message broadcasted to them.

By an embodiment of the present invention, the broadcasting device is operated based on information retrieved by DTMF tones generated within the telephone interchange system. However, it should be understood any other type of digital or analog signaling system could be used.

As shown in FIG. 4, when incoming call 200 reaches the system, certain call details are retrieved therefrom, 210, e.g. the caller's ID associated with the incoming call. According to this example an IVR menu is then presented to the caller. Preferably, different IVR menus may be presented and the selection of the proper menu can also be made in response to the call details. The caller then navigates through different hierarchically constructed questions, 204a, 204b and 204c; 206a, 206b and 206c; 208a, 208b and 208c etc., and based on the responses received from the caller, (with or without the information retrieved from the call details 210) a determination is made 215, whether the caller is suitable to receive a broadcasted message. If the caller is not identified based on the above, to be one to whom a broadcasted message is applicable at this stage, he may be referred (step 220) to another menu and continue the IVR process as before. If on the other hand, the caller is identified at this stage as one for which an appropriate message can be broadcasted, the call is added to a group queue. This may be by any of the well-known techniques and those skilled in the art. Where the caller is the first to be placed in the group, the priority process according to one embodiment of the invention, is initiated. In the case exemplified herein, the priority processing is made by a timer as discussed above. If there are already other calls waiting in the queue (step 225), the call is added to the group (step 230). If there are no other calls yet in the group, a new group is established and a timer is started (235). As new calls come into the system, they are added to an existing group in a way similar to that of the first caller, or a new group is started. Upon the termination of the priority process (240), in this case, the time out of the group timer, all of the callers in that group are accessed (step 250). As shown in the figure, processing according to the expiration of the priority scheme may be continuance with a delay such as a one second delay (245). In the case of the preferred embodiment, the group timer for any one group with respect to a particular common interest is queried at one second intervals.

Upon the expiration of pre-set period, the system connects all callers for the broadcasting of the message (250). In the meantime, updated information applicable to that group is retrieved (whether through direct communication with an information source and/or from a storage database that comprises updated messages), step 255, and a message is composed (260).

A designated port (or a number of ports) may then be accessed (265) e.g. by DTMF tones and a single broadcasted message for the respective group is made (270). This may be accomplished in a time multiplex switch, or a multiplex connection from the broadcasting port to each of the connected trunk lines. As soon as the message has been completed (275), the callers may be disconnected from the designated port (280).

Here again, the same port may contain more than one message which may be broadcasted to other groups. The information for constructing the message may be retrieved by approaching a pre-determined site at the Internet, retrieving updated information therefrom and returning that information to the message generator. In addition or in the alternative a storage device may be used, which includes a database for stored messages. In such a case, there are also included means to approach the appropriate sources of information, retrieve the updated information therefrom, and update the messages included in the database with the most recently updated information.

It is appreciated that various features of the invention which are, for clarity, described in the contexts of separate embodiments may also be provided in combination in a single embodiment. Conversely, various features of the invention, which are, for brevity, described in the context of a single embodiment, may also be provided separately or in any suitable sub-combination.

It will be appreciated by persons skilled in the art that the present invention is not limited by what has been particularly shown and described herein above. Rather the scope of the invention is defined by the claims that follow:

What is claimed is:

1. A method of using a communication device which comprises a plurality of ports adapted to receive a plurality of communication sessions, which method comprises the steps of:
    identifying subscribers having at least a first common characteristic,
    retrieving real time updated information applicable to said identified subscribers and broadcasting to said identified subscribers a message based on said real time updated information via designated ports connected to said communication device, wherein the number of designated ports is less than the number of said subscribers having the at least one common characteristic,
    receiving a first plurality of communication sessions;
    identifying subscribers having a first common characteristic among subscribers associated with said first plurality of communication sessions;
    identifying a second plurality of communication sessions out of said first plurality of communication sessions associated with said subscribers identified as having a first common characteristic;
    retrieving real time updated information applicable to said subscribers associated with said second plurality of communication sessions;
    arranging the second plurality of communication sessions in a first group of communication sessions;
    connecting the first group of communication sessions to a first designated port connected to a real time message generator; and
    broadcasting to said subscribers associated with said first group of communication sessions, a first message constructed in response to said first common characteristic.

2. A method according to claim 1, wherein the number of said designated ports is equal to one.

3. A method according to claim 1, wherein at least part of said real time updated information is retrieved from the Internet.

4. A method according to claim 1, wherein at least part of said real time updated information is retrieved from a dynamically updateable database.

5. A method according to claim 1, wherein at least part of said real time updated information is retrieved from signaling details associated with the call.

6. A method according to claim 1, wherein at least part of said real time updated information is retrieved from information provided by said subscribers associated with said second plurality of communication sessions.

7. A method according to claim 1, wherein said first message is broadcasted by a live operator.

8. A method according claim 1, wherein said at least first common characteristic comprises a common interest in retrieving information of interest to said subscribers associated with said second plurality of communication sessions.

9. A method according to claim 1, wherein said at least first common characteristic comprises a common interest in receiving a service which is of interest to said subscribers associated with said second plurality of communication sessions.

10. A method according to claim 1, wherein the step of connecting the first group of communication sessions includes the steps of:
    measuring a period time lapsed since a first of said second plurality of communication sessions has been associated with said first group; and
    responsive to said step of measuring the period of time, connecting said first group to said message generator.

11. A method according to claim 1, wherein a message is re-broadcasted upon completing a previous broadcast of said message.

12. A method according to claim 1, wherein said second plurality of communication sessions are associated with subscribers waiting to be serviced by a call agent.

13. A method according to claim 1, comprising the steps of:
    identifying a third plurality of communication sessions among said second plurality of communication sessions and associated with subscribers having a second common identifying characteristic;
    arranging a second group of communication sessions associated with said subscribers having said second common identifying characteristic; and
    broadcasting to said subscribers associated with said second group of communication sessions, a second message constructed in response to said second common characteristic.

14. The method of claim 13, wherein the step of identifying a third plurality of communication sessions is made in response to further information received from the subscribers associated with said third plurality of communication sessions.

15. The method of claim 13, comprising the steps of:
    identifying at least one other port associated with said communication device and adapted to broadcast messages; and
    connecting said second group of communication sessions through said at least one other port, to receive a second message broadcasted through said at least one other port.

16. The method according to claim 1, wherein said subscribers are telephone callers and said respective communication sessions are telephone calls.

17. A method according to claim 1, wherein said subscribers are telephone callers and said first common characteristic being that they are all intended to participate in a teleconference call.

* * * * *